United States Patent Office 3,825,555
Patented July 23, 1974

3,825,555
3-SUBSTITUTED 4-ALKANOYL OXAZASPIRO INSECT REPELLENTS
Thomas A. Lajiness, Racine, Wis., assignor to S. C. Johnson & Son, Inc., Racine, Wis.
No Drawing. Original application Mar. 16, 1970, Ser. No. 20,097, now Patent No. 3,707,541. Divided and this application May 22, 1972, Ser. No. 255,893
Int. Cl. C07d 85/26
U.S. Cl. 260—307 F    3 Claims

ABSTRACT OF THE DISCLOSURE

A compound of the formula

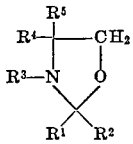

wherein $R^1$ and $R^2$ taken together are alkylene having from four to six carbon atoms, $R^3$ is an alkanoyl, $R^4$ is an alkyl group having less than four carbon atoms, and $R^5$ is hydrogen or an alkyl group having less than four carbon atoms.

---

This is a division of application Ser. No. 20,097, filed Mar. 16, 1970, now U.S. Pat. No. 3,707,541.

This invention relates to novel compositions suitable for use as insect repellents and to the process for using the same.

Compositions which are capable of imparting durable insect repellency are of great potential importance. Such compositions are valuable in protecting the health and comfort of persons inhabiting insect-infested areas, as well as in protecting pets, livestock, plants and inanimate objects such as textiles, paper goods, foodstuffs and the like, from attack by insects. The use of repellents as an environment control device is greatly preferred to the use of poisonous insecticides with their inherent dangers. Moreover, pesticides are generally not capable of either preventing pests from alighting or biting, which may lead to infection, since the action of pesticides occurs generally after a certain latent period. Pest repellents serve the purpose of deterring pests and especially flying insects from alighting and hence from biting and sucking. Hence, pest repellents serve an important hygienic purposes and continuous attempts are made to improve the activity of these substances.

The present invention provides a class of compounds and compositions containing the same which are useful as pest repellents, i.e., they repel one or more species of arthropods which are troublesome to man and animals because of stinging, biting, blood sucking or other annoying or dangerous activities including the carrying of disease germs. Certain of these compounds are particularly effective broad range mosquito, roach and fly repellents. In preferred embodiments of the invention, this activity is persistent or durable and thus confers long-lasting protection against insect pests. Compounds of the invention are also useful as toxicant synergists for insecticide formulations.

The compounds employed in the process of invention can be generally represented by the structure

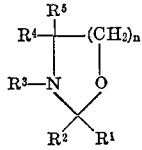

wherein $R^1$ is an aliphatic or aromatic group, preferably aryl, alkyd or alkenyl of at least four carbon atoms or joined together with $R^2$ to form an alkylene group; $R^2$, $R^4$ and $R^5$ are each, independently, hydrogen, an aliphatic or aromatic group, preferably hydrogen, lower alkyl or lower alkenyl; $R^4$ is lower alkyl when $R^1$ is aryl and when $R^1$ and $R^2$ together are alkylene; $R^3$ is an electron-withdrawing acyl group; and $n$ is 1 or 2. Lower alkyl and alkenyl, as those terms are used herein, designate alkyls and alkenyls of less than about four carbon atoms.

The compounds used in the process of the invention are 2-substituted oxazolidines and 1,3-tetrahydrooxazines bearing an electron-withdrawing substituent on the ring nitrogen. The presence of such substituents is important to both the activity and stability of the compound. Oxazolidine and 1,3-tetrahydrooxazine compounds bearing a hydrogen atom on the ring nitrogen are prone to cleavage, with the resultant formation of an acrylic Schiff base. This instability of the compound must be considered for its toxological and dermatological consequences as well as its effect on activity and durability.

The electron-withdrawing substituent $R^3$ will be an acyl substituent, preferably alkanoyl, and most preferably lower alkanoyl. Such acyl substituents generally confer the greatest stability, coupled with low mamalian toxicity. Representative acyl groups include formyl, acetyl, propionyl, n-butryl, isbutyryl, valeryl, caproyl, caprylyl, as well as inertly substituted derivatives thereof. In many cases, the alkanoyl group can be replaced by aroyl or heteroaroyl groups, typified by benzoyl, furoyl, picolinoyl, nicotinoyl and the like, but this generally causes a marked reduction in repellency properties. It is usually preferred to use unsubstituted acyl groups for ease of preparation and minimum expense. However, inertly substituted groups such as chloroalkanoyl, alkoxyalkanoyl, arylalkanoyl, and hydroxyalkanoyl are also within the scope of the invention. Similarly, mixtures of acyl groups, such as may be present in carboxylic acids derived from natural sources can also be used.

The compounds will also bear an aliphatic or aromatic substituent at the 2-position. It will be understood that the useful aliphatic substituents include straight-chain, branched-chain and alicyclic groups which are saturated or unsaturated. Typically, this substituent will be an alkyl, alkenyl or monocarbocyclic aryl substitutent, such as methyl, ethyl, n-propyl, isopropyl, n-butyl, sec-butyl, tert-butyl, n-amyl, isopentyl, hexyl, heptyl, octyl, nonyl, decyl, dodecyl, cyclopentyl, cyclohexyl, phenyl, allyl, butenyl, pentenyl, hexenyl, heptenyl, octenyl, decenyl, dodecenyl, and derivatives thereof bearing one or more inert substituents such as alkoxy, halogen, alkyl, aryl, alkenyl, alkoxycarbonyl, nitro, carbalkoxy, amino, alkylamino, hydroxy, aryloxy and the like. It is particularly desirable that $R^1$ contain at least about four carbon atoms, but not greater than twelve carbon atoms, in order to realize maximum repellency. Branched chain alkyls and alkenyls are especially preferred. The use of $R^1$ groups of four or more carbon atoms is especially desirable when $R^2$, $R^4$ and $R^5$ are each hydrogen. $R^1$ and $R^2$ may also be combined to form an alkylene group, typically an alkylene of 4 to 6 carbon atoms. When $R^1$ is aryl, such as 2-phenyl or $R^1$ and $R^2$ together are alkylene, such as 2,2-pentamethylene, it is particularly desirable that $R^4$ be lower alkyl.

Each of $R^2$, $R^4$ and $R^5$ can be hydrogen, an aromatic group or an aliphatic group. Preferred $R^2$, $R^4$ and $R^5$ substituents are hydrogen, monocarbocyclic aryl or lower alkyl, including inertly substituted derivatives thereof, as hereinbefore described. Hydrogen and lower alkyls of less than about four carbon atoms are especially preferred.

Additionally, other positions of the oxazolidine or 1,3-tetrahydrooxazine rings may bear one or more inert substitutes without destroying the repellent activity. Any of the substituents which are suitably located can be combined in a cyclic structure, this being especially true of gem substituents such as $R^1$ and $R^2$ or $R^4$ and $R^5$.

The high order of repellency possessed by the oxazolidine and tetrahydrooxazine compounds of the invention is attributed to the above noted combination of substituents. Additional substituents may also be present provided they are selected with due regard for existing knowledge in the art. Thus, those skilled in the art will appreciate the desirability of avoiding extremely large substituents which would unnecessarily dilute the active portion of the molecule or reduce its vapor pressure or solubility to a point where the compound loses its effectiveness. Similarly, it is desirable to avoid substituents which can be expected to cause toxological ordematological problems when used on animals or humans.

While compounds of the general structure described above are active insect repellents which are effective against one or more insect species, it has been found that a particular, novel class of compounds is characterized by particularly broad range and long duration of repellence activity. This novel class of compounds may be represented by the structure:

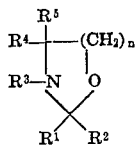

wherein $R^1$ is selected from the group consisting of aryl, branched alkyl of four to twelve carbon atoms, branched alkenyl of four to twelve carbon atoms and alkylene together with $R^2$; $R^2$, $R^4$ and $R^5$ are hydrogen or lower alkyl of less than about four carbon atoms; $R^4$ is lower alkyl when $R^1$ is aryl and when $R^1$ and $R^2$ together are alkylene; $R^3$ is lower alkanoyl; and $n$ is 1 or 2.

Compounds of the invention are readily prepared by reaction of an aminoalcohol with an aldehyde or ketone, followed by introduction of the desired $R^3$ substituent. The overall reaction can be illustrated as follows:

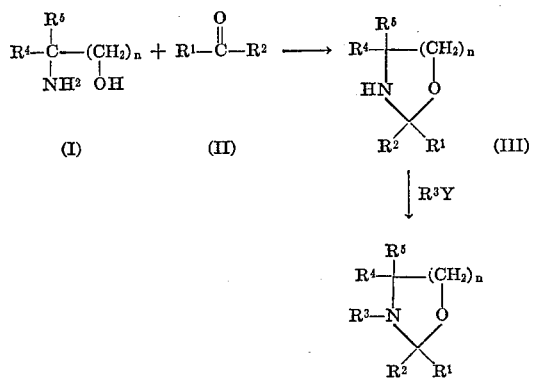

wherein $R^1$, $R^2$, $R^3$, $R^4$, $R^5$, and $n$ are as described above and $R^3Y$ is an amine-reactive compound of $R^3$, for example and acyl halide or anhydride. The reaction of compounds (I) and (II) to produce compound (III) is preferably carried out in solution in an inert solvent under dehydrating conditions, for example in refluxing benzene whereby water is removed as the benzene-water azeotrope.

As noted above, compounds of the formula (III) are relatively unstable. Accordingly, compound (III) may be produced, partly or wholly, as the corresponding Schiff's base:

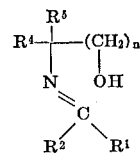

In any event, reaction with $R^3Y$ yields the desired cyclic structure, regardless of which form of compound (III) is predominant.

The conditions employed in reacting compound (III) with $R^3Y$ will depend upon the precise nature of $R^3Y$. Where $R^3Y$ is a carboxylic acid anhydride, such as acetic or benzoic anhydride, it can be added directly to the reaction solution of compound (III) to form the N-acylated product and the free acid as by-product. Where the group Y in $R^3Y$ is halogen, e.g., where $R^3Y$ is an acyl halide, it is desirable to include in the reaction mixture at least an equimolar amount of a suitable base, such as pyridine, to take up the halogen acid produced. The reaction of compound (III) with $R^3Y$ can be carried out at moderate temperatures, of the order of 30°–80° C., preferably in an inert, water-immiscible solvent. The desired product is typically recovered by wasing the reaction solution with water, drying the organic layer and distilling at atmospheric or reduced pressures. It will be apparent that cis-trans isomers can be produced in some embodiments of the invention. It is generally unnecessary to separate the isomers, since the mixture can be employed in the practice of the invention.

Illustrative compounds falling within the scope of the invention include the following:

1. 3-acetyl-4,4-dimethyl-2-[3-pentyl] oxazolidine
2. 3-acetyl-2-[3-heptyl] oxazolidine
3. 3-acetyl-4-ethyl-2-[3-heptyl] oxazolidine
4. 3-acetyl-4, 4-dimethyl-2-[3-heptyl] oxazolidine
5. 3-acetyl-4-ethyl-2-methyl-2-pentyloxazolidine
6. 3-acetyl-2-butyl-2-ethyloxazolidine
7. 3-acetyl-2-butyl-2,4-diethyloxazolidine
8. 3-acetyl-2-isopentyl-2-methyloxazolidine
9. 3-acetyl-4-ethyl-2-isopentyl-2-methyloxazolidine
10. 3-acetyl-2-isopentyl-2,4,4-trimethyloxazolidine
11. 3-acetyl-2-[2,6-dimethyl-5-heptenyl] oxazolidine
12. 3-acetyl-2-[2,6-dimethyl-5-heptenyl]-4-ethyl-oxazolidine
13. 3-acetyl-4,4-dimethyl-2-[2,6-dimethyl-5-heptenyl] oxazolidine
14. 3-acetyl-4-ethyl-2-phenyloxazolidine
15. 3-acetyl-4,4-dimethyl-2-phenyloxazolidine
16. 4-acetyl-3-ethyl-1-oxa-4-azaspiro [4.5] decane
17. 3-ethyl-4-propionyl-1-oxa-4-azaspiro [4.5] decane
18. 4-acetyl-3,3-dimethyl-1-oxa-4-azaspiro [4.5] decane
19. 3,3-dimethyl-4-isobutyryl-1-oxa-4-azaspiro [4.5] decane
20. 3,3-dimethyl-4-propionyl-1-oxa-4-azaspiro [4.5] decane
21. 4-acetyl-3-ethyl-1-oxa-4-azaspiro [4.4] nonane
22. 3-benzoyl-tetrahydro-2—isopropyl—2-$\underline{H}$-1,3-oxazine
23. 3-benzoyl-tetrahydro-2-[2,6-dimethyl-5-heptenyl] 2-H-1,3-oxazine
24. 3-acetyl-tetrahydro-2-isopropyl-2-$\underline{H}$-1,3-oxazine
25. 3-acetyl-tetrahydro-2-[3-pentyl]-2-$\underline{H}$-1,3-oxazine
26. 3-acetyl-tetrahydro-2-[3-heptyl]-2-$\underline{H}$-1,3-oxazine
27. 3-acetyl-tetrahydro-2-[2,6-dimethyl-5-heptenyl]-2-$\underline{H}$-1,3-oxazine
28. 3-acetyl-tetrahydro-2-phenyl-2-$\underline{H}$-1,3-oxazine In the foregoing description it will be understood that "isopentyl" designates the group —$CH_2CH_2CH(CH_3)_2$ and "isobutyl" designates the group —$CH_2CH(CH_3)_2$. The spirodecane compounds may also be designated as 2,2-pentamethylene oxazolidines. Selection of the necessary reactants to make the above compounds will be apparent from an inspection of their structures in light of the general reaction equations hereinbefore given.

Compounds of the invention are characterized by the ability to repel one or more insect pests, such as mosquitos, cockroaches, flies, fleas, ticks, moths, carpet beetles, lice and the like. Particular compounds may be effective in repelling a single species or a few species of insect, whereas others are effective against a broad range of insects. In preferred embodiments, this repellent activity is persistent and durable for a considerable period of time. Thus, these compounds are both convenient and economical to use.

Generally, the compound is applied to the substrate which is to be protected from insect attack. The substrate may be, for example, human skin, animal skin, textile materials, plants, etc. The compounds may also be employed to form an insect barrier. They may be incorporated into various materials such as clothing, tarpaulins, plastic sheet or the like which are placed adjacent to or covering the substrate to be protected.

Pest repellent compositions embodying the compounds can be provided in all forms customarily used to impart pest repellency. For example, one can produce sprays, solutions, emulsions, salves or ointments, lacquers, paints or pastes, etc. The concentration of the active ingredients which can be one or more of the aforesaid compounds, may be generally from as low as about 0.01% up to about 95% by weight of the composition which comprises a suitable vehicle or carrier, or if desired, a diluent.

Although it is, of course, possible to use the compound undiluted, it is usually more suitable, because it achieves even distribution easier and for economic reasons, to dilute the active substance with a solid, liquid or semi-solid carrier which can itself be a mixture of several substances. Such carriers can be of the most varied nature, but should preferably be harmless to warm-blooded animals, under the condition of use, i.e., in the quantities and concentration used in the chosen method of application.

As solid carriers there may be mentioned in particular, pulverulent organic or inorganic substances such as calcium phosphate, calcium carbonate, kaolin, calcined magnesia, kieselguhr, boric acid, cork meal, wood meal and, especially, talc and starch powder. These are impregnated with the active ingredient by known methods. Such dusting-agents are particularly suitable for dusting linen and clothing.

As liquid there comes into consideration both organic solvents and inorganic media which fulfill the requirements given above. Organic solvents, such as alcohols, esters, and ketones, i.e., ethanol, propanol, benzyl alcohol, glycerol, propanone-2, butanone-2, cyclohexenol and other hydrated phenols, ethylacetate, glycol-monoethyl-ether, cyclohexanone, etc., are suitable as carriers both for use on the skin and for impregnating textiles and the like. The form found preferable for repelling insects from the human body is a solution of the compounds according to the invention in low-boiling solvents such as, e.g., iso-propanol.

Solutions in oils of vegetable, animal, mineral and synthetic origin, such as e.g., olive oil, arachis oil, castor oil and paraffin oil also come into consideration, such oils are useful for addition to solutions in low-boiling solvents.

For use in spraying, the known spray-solvents are particularly suitable, e.g., mineral oil distillates of the kerosene type, hydrogenated naphthalenes, and alkylated naphthalenes.

Emulsions and dispersions in an aqueous medium are suitable for purposes of spraying. Here the compound is mixed for this purpose, if necessary with the addition of organic solvents, with surface active agents which may be of the non-ionic actionic or anionic type. The concentrate can then be mixed with water to form with a water-in-oil or oil-in-water emulsion. When pressurized repellents are desired, compositions containing water-in-oil emulsions such as described in U.S. Pat. 3,159,535 to Sesso et al. are preferred.

The following representative examples are illustrative of the preparation of compounds of the invention.

EXAMPLE 1

3-acetyl-2-isopentyl-2-methyl oxazolidine

A solution of 57.1 g. (0.5 mole) of 5-methyl-2-hexanone and 30.5 g. (0.5 mole) ethanolamine in 500 ml. of benzene was stirred at reflux for four hours. At this time the theoretical amount (9 ml.) of water had separated. The water was removed and reaction cooled in an ice bath. To this solution was added 80 ml. of pyridine followed by the dropwise addition of 51 g. (0.5 mole) of acetic anhydride over 45 minutes, while refluxing. The reaction was then stirred at reflux for an additional 2.75 hours, cooled to room temperature, allowed to stand for 2 days, then washed with six 500 ml. portions of water, dried over sodium sulfate, filtered and concentrated, and the residue was distilled at 77–78° C. (0.03 mm.) to give a 57% yield of material, $N_D^{25}$ 1.4560, $R_f=0.58$ (5:1 benzene-ethanol). Infrared and NMR were consistent with the proposed structure.

EXAMPLE 2

3-acetyl-4-ethyl-2-phenyloxazolidine

A mixture of 53.0 g. (0.5 moles) of benzaldehyde and 44.6 g. (0.5 moles) of 2-aminobutabol in 500 ml. of benzene was stirred at reflux for 0.5 hour. The theoretical amount of water (9 ml.) was removed and 80 ml. of pyridine added to the reaction, followed by the dropwise addition of 51 g. (0.5 mole) of acetic anhydride over 1.5 hours. The reaction was stirred at reflux an additional hour, cooled to room temperature, washed with six 500 ml. portions of water, dried over anhydrous sodium sulfate. The reaction residue solidified on concentration and was recrystallized, 4:1 (v./v.) heptane-ethyl acetate to yield 53.0 g. (48.6 percent) of a white crystalline material melting at 66.0–67.5° C. $R_f=0.60$ (5:1 benzene-ethanol). Infrared and NMR spectra were consistent with the proposed structure.

EXAMPLE 3

3-acetyl-2-[2,6-dimethyl-5-heptenyl] oxazolidine

A 77.1 g. (0.5 mole) quantity of citronellal was added dropwise over approximately 2 hours to a solution of 30.5 g. (0.5 mole) of ethanolamine in 500 ml. of benzene at reflux. The theoretical amount of $H_2O$ (9ml.) separated along with 75 ml. of benzene. A 80 ml. portion of pyridine was then added. Then 51.0 g. (0.5 mole) of acetic anhydride was added dropwise over 1 hour to the refluxing solution. The reaction was stirred an additional 2 hours at reflux, cooled to rom temperature and washed with five 500 ml. portions of water and then dried over anhydrous magnesium sulfate, filtered, concentrated and the residue distilled. Product distilling at 120–122° C. (0.10 mm.), $N_D^{26}$ 1.4778, $R_f=0.57$ (5:1 Benzene Ethanol) was isolated in 55 percent yield. Infrared and NMR spectra were consistent with proposed structure.

EXAMPLE 4

3-acetyl-tetrahydro-2-[3-pentyl]-2-H1,3 oxazine

To a one liter 3-neck flask equipped with a mechanical stirrer, water separator, condensor, drying tube and dropping funnel was charged 350 ml. of dry benzene, and 37.5 g. (0.5 mole) of 3-amino-1-propanol. This solution was heated to reflux and 50.1 g. (5.0 mole) of 2-ethylbutyr-aldehyde added dropwise over 1 hr. After 9 ml. of water was removed, 75 ml. of benzene was distilled and 80 ml. of pyridine added to the reaction solution. To the resultant solution was added 39.3 g. (0.5 mole) of acetyl chloride over 1 hour at reflux. The reaction was stirred for an additional 5 hours at reflux and cooled to room temperature, diluted with an additional 200 ml. of benzene and then washed with six 500 ml. portions of water, and finally dried over sodium sulfate. The reaction was concentrated to yield 69.1 g. of residue. A repeat of this procedure yielded 67.1 g. of residue. The crude reaction residues were combined and distilled through a 30 x 2 cm. column packed wiht 3/16" glass helices, to yield 65 g. of material b.p. 73° C. 0.05 mm.). $N_D^{24}$ 1.7449 $R_f$=0.74 (5:1 Benzene-Ethanol), yield 67 percent. The product appeared homogeneous by VPC and TLC.

The following representative examples are illustrative of the useful insect repellent properties of the compounds of the invention. In the following insect repellency tests, the compounds employed are identified by number, corresponding to the tabulation given above.

Animal Protection Test

EXAMPLE 5

Mosquito Repellent Tests

Compounds are screened as mosquito repellents by exposing arms covered with treated cotton stockings in cages of *Aedes aegypti* mosquitoes. The stockings are treated with a 10-percent solution of the compound in a volatile solvent, usually acetone, at 3.3 grams of the compound per square foot. Two hours after treatment, the stockings are exposed for 1 minute on the arm of a human subject in a cage of mosquitoes. If less than 5 mosquitoes bite the subject through the stocking, the test is repeated at intervals of 1 to 7 days until 5 bites are received in 1 minute. After the first month, the tests are made at weekly intervals. Under these conditions the standard repellent, dimethyl phthalate, is effective for 11 to 22 days.

When tested according to the above procedure, the noted compounds gave the following results:

| Compound: | Time to 5th bite (days) |
|---|---|
| 2 | 22 |
| 3 | 8 |
| 4 | 8 |
| 5 | 22 |
| 6 | 8 |
| 7 | 8 |
| 8 | 3 |
| 9 | 15 |
| 10 | 8 |
| 11 | 64 |
| 15 | 22 |
| 16 | 43 |
| 18 | 15 |
| 20 | 22 |
| 21 | 15 |
| 25 | 16 |
| 26 | 50 |

EXAMPLE 6

Additionally, then tested against Aedes aegypti using the method described by Wright et al., can Ent. *100,* 763 (1968) compounds of the invention show excellent intrinsic mosquito repellency. Using this method, N,N-diethyl-*m*-toluamide, a standard commercial repellent, showed 90% repellency at 0.009 micro moles per liter. The results are as follows:

| Compound: | Concentration in $\mu$m./l. for 90% repellency |
|---|---|
| 2 | 0.008 |
| 3 | 0.019 |
| 4 | 0.028 |
| 9 | 0.044 |
| 10 | 0.066 |
| 11 | 0.084 |
| 15 | 0.004 |
| 16 | 0.012 |
| 18 | 0.014 |
| 19 | 0.008 |
| 26 | 0.015 |

EXAMPLE 7

Repellent Test—Cockroaches

The candidate repellent is tested at 1 percent in acetone. One milliliter of the solution is pipetted into a cardboard box two inches square and one inch deep, and the sides of which have V-shaped openings cut in the open ends so that the cockroaches may enter and rest on the inside as well as the outside surfaces of the box. The treated box and an untreated box are inverted and placed in a crystallizing dish in which 10 male and 10 female German cockroaches are confined. Counts are made daily of the number of insects in each box. The insects are shaken out and the position of the boxes reversed after each count. Six daily counts are made during a week's time. The percent of insects in the treated box of the total number in both boxes is calculated. Zero indicates complete repellency whereas fifty percent or more indicates no repellency. Fencholic acid is tested as a standard concurrently with the candidate repellent. The same test is used to measure repellency with respect to the American cockroach, the only difference being that a larger container is used because of the larger size of the insect. When testing against American cockroaches, the container is a half-pint ice cream carton, treated at a dosage of 2 ml. per 150 cm.$^2$ of surface. The results are as follows:

| Compound | Repellency index American roach | Repellency index German roach |
|---|---|---|
| 2 | 4 | 3 |
| 3 | 13 | 4 |
| 4 | 5 | 8 |
| 5 |  | 20 |
| 6 |  | 21 |
| 7 |  | 5 |
| 8 | 0 | 8 |
| 9 | 2 | 2 |
| 10 | 4 | 0 |
| 11 | 14 | 24 |
| 12 | 48 | 14 |
| 13 | 52 | 6 |
| 15 | 9 | 4 |
| 16 | 0 | 10 |
| 18 |  | 0 |
| 19 | 0 | 9 |
| 20 |  | 14 |
| 21 | 18 | 8 |
| 22 | 10 | 20 |
| 26 | 0 | 3 |
| 27 | 32 | 12 |
| 28 | 0 | 0 |

EXAMPLE 8

Stable Fly Repellency Tests

Candidate insecticides are screened as animal protectant sprays by the spot-test method. An area 6 inches in diameter on the side of a cow is sprayed with 5 ml. of 5% solution of the compound in acetone. Materials not soluble in acetone are applied in other solvents. During the winter months the hair on each area is clipped to 1/4–1/2 inch in length so that the flies can reach the skin to feed, but clipping is not necessary when the animals are in summer coat. Five test areas are spaced on either side of an animal, and are positioned so that cross-contamination is unlikely. The animals are confined in individual stalls which are lighted by sunlamps 4 hours each day.

Cages, made by soldering screen wire in a mason-jar ring, are used to confine adult stable flies (*Stomoxys calcitrans* (L.)) to the treated spots. Twenty-five 3- to 6-day-old female flies that have not fed for about 18 hours are exposed to each spot for 20 minutes. After exposure the flies are moved to a constant-temperature room for holding at 78° F. and 70% relative humidity.

Repellency is measured by subtracting the percentages of flies that feed from 100%. When more than 20% of the flies feed, the compound is considered to have failed as a repellent.

Compounds are tested for repellency at a 5.0% concentration, and 0.5% pyrethrine, which is effective for 4 days, is used as a standard of comparison.

Repellency

Class I _____ Effective at 1 day.
Class II _____ Ineffective for 1 day.
Class III _____ Effective for 2–3 days.
Class IV _____ Effective for 4 or more days.

The results are as follows:

| Compound: | Repellency class |
|---|---|
| 3 | III |
| 11 | IV |
| 12 | III |
| 23 | IV |
| 27 | IV |

EXAMPLE 9

Face Fly Repellency Test

Two 9 cm. filter papers are saturated with a 5 percent acetone solution of the candidate repellent. A third 9 cm. filter paper is saturated with acetone and used as a standard to establish fly vigor. The three filter papers are air dried and placed on one surface of a wire cage containing approximately 800 face flies. The flies are attracted to this surface by a light source placed behind the cage. The flies are exposed to the filter papers for 1 minute and the number of flies standing or crawling on a filter paper for 3 seconds or longer is recorded. When this number exceeds 16 on both filter papers containing the repellent, the test is terminated. Each set is checked at 1 hour, 1 and 2 days and 1, 2, 3 and 4 weeks if repellency is indicated. Test data is reported as time until termination of test.

| Compound: | Effective period, weeks |
|---|---|
| 1 | 2 |
| 2 | >4 |
| 3 | >4 |
| 4 | >4 |
| 5 | >4 |
| 6 | 2 |
| 7 | 3 |
| 9 | >4 |
| 10 | 2 |
| 17 | >4 |
| 20 | >4 |
| 25 | 4 |
| 27 | >4 |

As will be noted from the foregoing repellency test results, compounds 1–4, 8–21, and 25–27, which are rep-representative of the novel compounds provided by the invention, exhibit a particularly high order and broad range of repellent activity.

What is claimed is:
1. 4-acetyl-3-ethyl-1-oxa-4-azaspiro[4.5]decane.
2. 3-ethyl-4-propionyl-1-oxa-4-azaspiro[4.5]decane.
3. 3,3-dimethyl-4-propionyl - 1 - oxa - 4 - azaspiro[4.5]decane.

References Cited

UNITED STATES PATENTS 3,707,541  12/1972  Lajiness _____ 260—244

OTHER REFERENCES

Dashkevich et al.: C.A. *64*, 9700h (1966).

RAYMOND V. RUSH, Primary Examiner